C. H. SCHURR.
METHOD OF GENERATING THE TEETH OF HELICAL GEAR WHEELS.
APPLICATION FILED JAN. 15, 1917.
1,230,940.
Patented June 26, 1917.
3 SHEETS—SHEET 1.
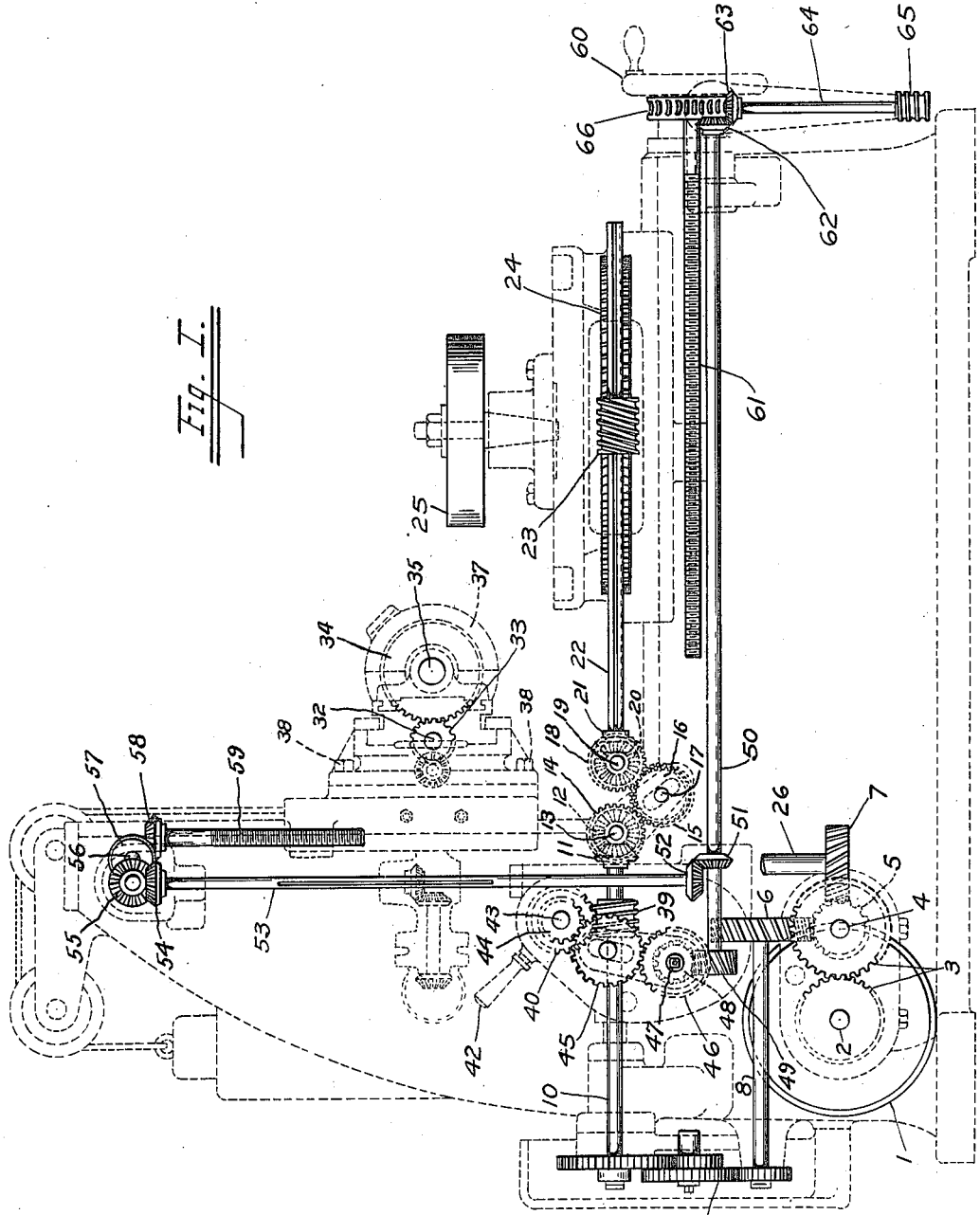
Fig. I.
Inventor:
Charles H. Schurr
by his atty C. H. SCHURR.
METHOD OF GENERATING THE TEETH OF HELICAL GEAR WHEELS.
APPLICATION FILED JAN. 15, 1917.
1,230,940.
Patented June 26, 1917.
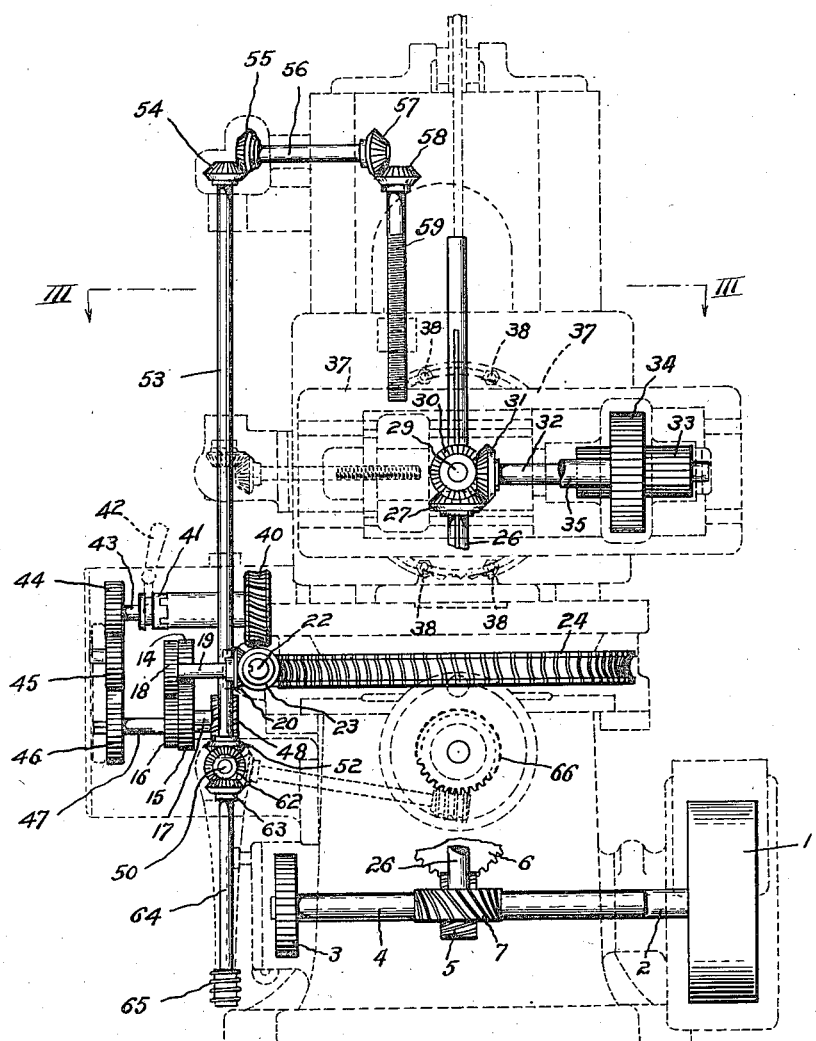
Fig. II.
Inventor:
Charles H. Schurr
by his atty

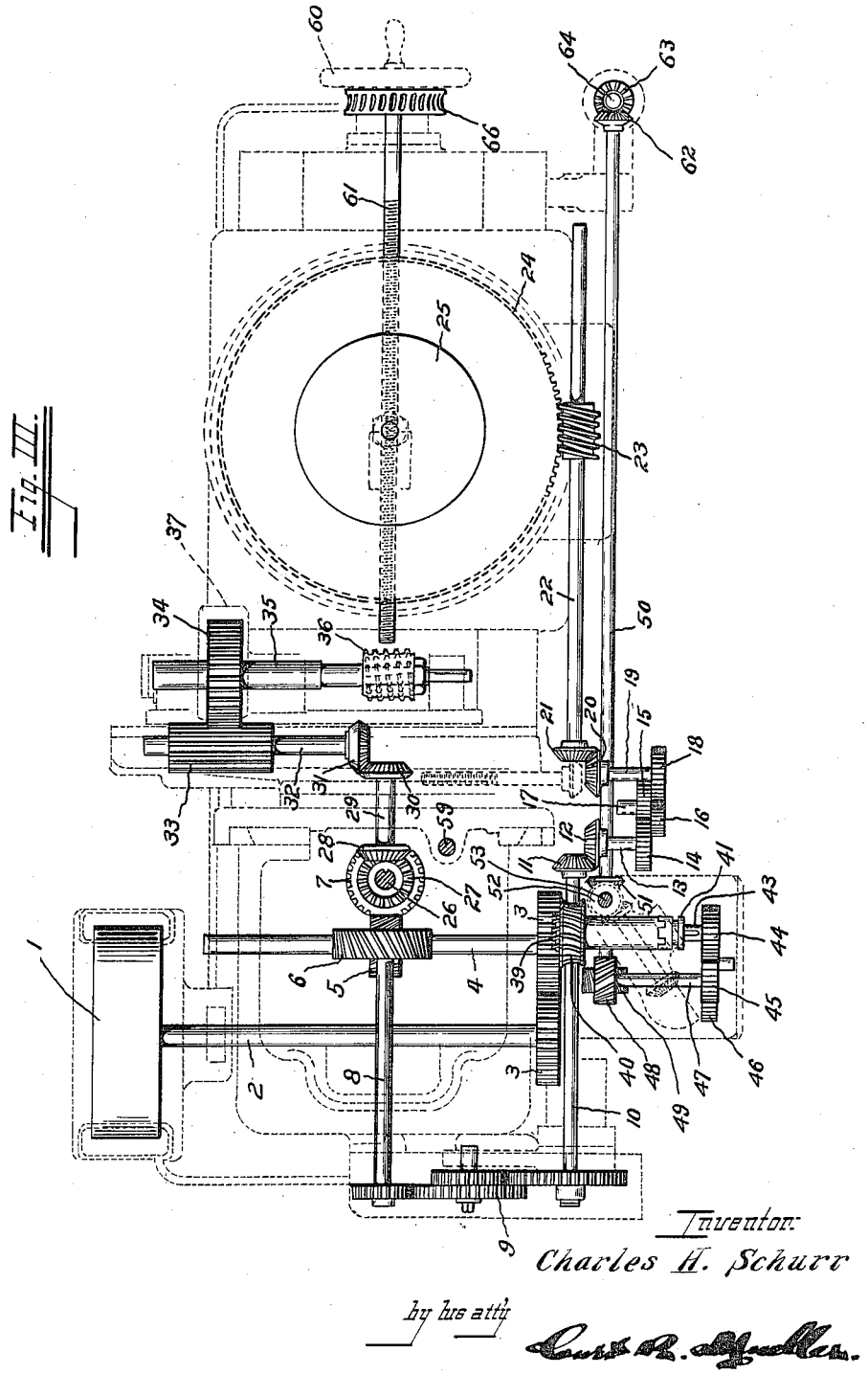

UNITED STATES PATENT OFFICE.

CHARLES H. SCHURR, OF CLEVELAND, OHIO, ASSIGNOR TO HOSEA T. BRADNER, OF CLEVELAND, OHIO.

METHOD OF GENERATING THE TEETH OF HELICAL GEAR-WHEELS.

1,230,940.   Specification of Letters Patent.   Patented June 26, 1917.

Application filed January 15, 1917. Serial No. 142,426.

*To all whom it may concern:*

Be it known that I, CHARLES H. SCHURR, a citizen of the United States, residing at city of Cleveland, in the county of Cuyahoga and State of Ohio, have invented a new and useful Improvement in Methods of Generating the Teeth of Helical Gear-Wheels, of which the following is a specification, the principle of the invention being here explained and the best mode in which I have contemplated applying that principle, so as to distinguish it from other inventions.

My present invention relates to the method of generating the teeth of helical gear wheels using a helical cutter known as a hob. More particularly the invention absolutely perfects and also simplifies the formula required to chart the various ratios of movement so that a resultant aggregate difference between the number of revolutions made by the hob and the number made by the blank, while the relative advance of the cutter and blank covers a predetermined distance along the axis of the blank, may be accomplished automatically.

Such difference is composed of a repetition of some predetermined measure which is either an increment or a decrement, but amounts to the equivalent of one revolution (plus or minus) and is the fundamental characteristic which has to be reckoned with because it distinguishes the generation of helical gears from that of spur gears. According to my chosen exemplification, the automatic machine operation relied upon to lessen the factors to be figured is accomplished by a chain of separated compensating lead gears connected between the cutter and an indexing worm and worm wheel and adapted to accumulate the required rotary increment or decrement by effecting one more or one less revolution of the gear blank. It should be understood however, that such difference may also be attained by added rotations of the cutter depending upon the number of teeth in the blank to be cut, or may be attained by proportionate added movement on the part of both blank and cutter. The relative location of such lead gears with respect to the indexing change gears and the feed change gears is optional though the advantage of lessening computations according to this invention makes it decidedly preferable to connect the feed change gears between the indexing gears and the lead gears because if the order is reversed a part of the formula must be corrected to suit. I instance the manner of achieving exactness by adding the number one to the consequent of a certain ratio, thereby in effect causing the driving gear to cease its rotation one rotation before the extra tooth on the driven gear is reached. In other words, according to the arbitrary example here to be selected the driver will make precisely one revolution less and the old error is quite eliminated.

Accordingly, the two-fold object of my invention is to make possible the manufacture of absolutely correct helical gears and to simplify the calculations for any given job. Besides attaining complete instead of approximate accuracy, my method solves complex fractions in a mechanical manner and does so automatically by separating part of the formulæ heretofore followed.

I let the spur constant equal the lead divided by the feed and reckon the helical constant as the lead divided by the feed plus or minus one.

Adverting to the drawings:

Figure I is a side elevation of a gear generator partly dotted embodying my invention.

Fig. II is an end elevation of the same with certain parts absent to bring others to better view.

Fig. III is a section on line III—III of Fig. II.

Power is, but need not necessarily be, taken from a single source, here, the pulley 1. This pulley transmits rotation to the shaft 2, thence through a set of gears 3 and along another shaft 4 to the helical gear 5 which engages with two helical gears 6 and 7 the former leading to the indexing mechanism and the latter to the cutter drive. The gear 6 is mounted on shaft 8 and transmits rotary motion through the four index change gears collectively designated as 9. The upper of these indexing gears is secured to a shaft which is divided in order to accommodate the insertion of the lead gears whereby one object of my invention is achieved. Such division creates what I term a feed shaft 10 and a lead shaft to be presently described. These lead gears include a miter pinion 11, miter gear 12 mounted on a short shaft 13, spur pinion 14 at the other end of such shaft, and spur gear 15 mounted together with a pinion 16 on a common bushing which is rotatable on a pin 17. The pinion 16 drives a gear 18 on the short shaft 19 and on the opposite end of the latter is a miter pinion 20 engaging a miter gear 21 keyed to a spline shaft 22 which carries a worm 23. The shaft 22 should be considered to be the lead shaft. This worm drives a worm gear 24 which is integrally connected with the work slide that supports the arbor on which the gear blank 25 is mounted.

The helical gear 7, seen in Figs. I and II, is mounted on a vertical spline shaft 26 on which a miter pinion 27 is slidable to drive miter gear 28 supported on a short shaft 29 which is visible in Fig. III. The other end of such shaft 29 mounts a miter pinion 30 adapted to drive the miter gear 31 which is on a shaft 32 that also carries a long spur pinion 33 from whence the rotation is communicated to a spur gear 34 fixed to the cutter spindle 35. The hob 36 is mounted on the spindle 35 and the whole is suitably attached to a swiveling head 37 adapted to be fixed by bolts 38.

The shaft 10 constitutes the rotating part from which the feed is taken off and may be considered as the point of inception of the feed motion or where the divaricating feed has its origin so as to fulfil the scheme of this invention. The shaft 10 carries a worm 39 (see Fig. I) which drives a worm gear 40 and the latter drives, through a clutch 41 controlled by a lever 42, another spline shaft 43. A gear 44 rotates with the spline shaft 43 to drive an idler 45 which in turn drives a gear 46 mounted on a shaft 47. The other end of the shaft 47 has on it a helical pinion 48 which drives a helical gear 49 that is mounted on a long shaft 50. Intermediately of its ends the shaft 50 carries a bevel pinion 51 meshing with a bevel gear 52 on a vertical spline shaft 53. At the upper end of the spline shaft 53 is a miter pinion 54 and this, as may be seen in Fig. II engages miter gear 55 on a shaft 56. At its opposite end the shaft 56 has a miter pinion 57 which engages a miter gear 58 on a screw 59 passing through a tapped hole in the head so as to enable it to raise or lower the head so as to effect the feed.

When the work is to be moved up to the hob, a hand wheel 60 is manipulated which actuates the long screw 61 and hence the work slide through which it passes. Occasionally, as when it is desired to cut worm wheels, it is desirable to traverse the work by power. To this end the shaft 50 carries a bevel pinion 62 which drives the gear 63 on a shaft 64 and therefore the worm 65. The shaft 64 may be swung up into the position shown in Fig. II so as to effect engagement with a worm gear 66 which is likewise mounted on the screw 61.

It should be understood that the design of this machine in respect to the location of certain gears is made suitable to a clearer disclosure of the distinct mechanism, and is rather distorted from the future appearance of a commercially satisfactory design.

My invention as already stated uses mechanism which will allow charts of diagrams of change gear wheels of those factors common to all helical gears, whereby such factors can be excluded from the formula since taken care of or compensated for automatically. It also comprehends the simple but valuable expedient of adding or subtracting the number one from a consequent instead of from an antecedent of a particular ratio. Such mechanism is separated from the indexing mechanism and placed between the work spindle and the point (secondary spindle) where the feed is first taken off, so that the feed is not altered thereby. Three terms can be known and charted, namely, (1) the number of teeth (2) the immediate numerical sequence and (3) the feed.

Let
  $NT$ = number of teeth in gear to be cut.
  $32 = CM$ = indexing constant in machine.
  $L$ = lead of helix of gear.
  $F$ = feed per revolution of gear blank.
  $\frac{1}{8} = FC$ = feed constant in machine.

Then formula for indexing gears is as follows:

$$\frac{NT}{CM} = \text{indexing gears.}$$

Formula for the compensating lead gears is as follows:

$$\frac{(L \div F)}{[(L \div F) + 1]} = \text{lead gears.}$$

Formula for feed gears is as follows:

$$F \div FC \text{ or } \frac{F}{FC} = \text{feed gears.}$$

The feed will be assumed as .035

A chart or table will be presumed to be available, of such a character as the portion now furnished:

[Examples selected inclosed in dotted lines.]

| Number of teeth. | Index gears. | Constants. | Lead gears. | Feed. | Feed gears. |
|---|---|---|---|---|---|
| 28 | | 468 | | .0348 | |
| 29 | | 469 | | .03485 | |
| 30 | 64—60 | 470 | 50—94 | .0349 | 65—100 |
| 31 | | 471 | 30—157 | .03495 | 43—100 |
| 32 | | 472 | | .0350 | |
| 33 | | 473 | | .0351 | |

*Example.*

30 teeth.
10 pitch.
Angle with axis 34° 56′.
Tangent of angle .69847
  Pitch diameter 3.660″
  Lead 16.462″

Formula for indexing change gears:

$$\frac{NT}{CM} = \frac{30}{32} = \text{indexing change gears.}$$

Formula for finding lead:

$$\frac{\text{Pitch diameter} \times 3.1416}{\text{Tangent of angle}} = \text{lead} = \frac{3.660'' \times 3.1416}{.69847} = 16.482'' = \text{lead.}$$

Formula for lead gearing:—

$$\frac{(L \div F)}{(L \div F) + 1} = \frac{(16.462 \div .035)}{(16.462 \div .035 + 1)} = \frac{470}{470 + 1} = \frac{470}{471} = \frac{50 \times 94}{30 \times 157} = \text{lead change gears.}$$

Formula for feed gearing, using the corrected or actual feed, namely, .03495:

$$F \div FC = \frac{3495}{100000} \div \frac{1}{8} = \frac{27960}{100000} = \frac{2796}{10000}$$

which factored into feed change gears, gives $$\frac{65 \times 43}{100 \times 100} = \text{feed change gears.}$$

The above formulæ are based on the relation between the hob work spindle, feed shaft and lead screw. They are correct when using a single thread hob of the same hand as the gear to be cut. When using an opposite hand hob to that of gear to be cut, plus 1 in the lead formula becomes minus 1.

The indexing change gears must be such as will give as many revolutions of the hob as there are teeth in the gear to be cut. The feed change gears are such as will produce a given relative feed as between the hob and the blank to be cut, along the blank's axis for each revolution of the so-called feed shaft. The lead change gears which constitute the essence of one of the two features of the present invention do not have the proportion of one to one. Consequently the work spindle and such feed shaft, made necessary by reason of taking off the feed ahead of the lead gears, do not have the same relation to each other. The feed change gears have no direct relation to the compensating lead change gears other than their relation to one, or, one revolution of the feed shaft to one and a fraction, plus or minus, of the work spindle. The relation between the feed shaft and the hob is such as will give one revolution of the hob for each tooth in the gear to be cut. The relation of the feed shaft to the work spindle through the lead gears is expressed by the quotient of the ratio of the lead of the helix of the gear to be cut to the feed per revolution of the feed shaft, divided by the ratio of such lead to the feed, plus or minus one; or in other words the work spindle must make one complete revolution more than the feed shaft while either the blank to be cut or the hob is fed one relative to the other a distance along the blank's axis equal to the lead of its helix.

The index change gears are obtained in accordance with the number of teeth in the gear to be cut, from a chart or diagram of index change gears, this diagram having been prepared for the various number of teeth that may be cut by means of the index change gear formula. The feed change gears are selected in accordance with the pitch, angle, and material of the blank. The lead change gears are obtained from a numerical sequence diagram or chart, the particular numerical sequence being determined by dividing the lead of the gear to be cut by the feed being employed. After the various change gear wheels are secured in their proper positions on the machine the latter is in operative condition. The essential idea which differentiates my invention from previous practice consists in separating the compensating lead change gears from the train of indexing change gears, and in then transmitting the power to the feed change gears from a point (feed shaft) in between the indexing and lead trains.

I claim:

1. The method of generating helical gear teeth, consisting in rotating a hob, rotating a gear blank in predetermined harmony with the rotation of said hob, simultaneously transmitting a relative correlated feed of said rotating parts parallel with the axis of the gear blank, and establishing in between the point where the feed is taken off and one of said rotating parts a correlation which is continuously and uniformly different from the feed correlation and variable according to the amount of feed such that a ratio between the number of revolutions made by the hob and the number of revolutions made by the gear blank is developed which is different from the ratio of the number of teeth in the gear to be cut to the number of threads in the hob while the relative feed as between the blank and hob covers a predetermined distance along the axis of the blank, whereby to avoid the need of correcting the feed due to such variable correlation.

2. The method of generating helical gear teeth, which consists in rotating a hob, rotating a gear blank in predetermined harmony with the rotation of said hob, simultaneously effecting a relative feed between said rotating parts parallel to the axis of the gear blank, and establishing in between the rotating member at which said feeding motion has its distinct origin and one of said rotating parts a correlation such that the operative equivalent of one exact revolution of the gear blank is had with reference to the revolutions of such rotating member while the relative advance of the blank and hob covers a given distance in a direction parallel to the blank's axis.

3. The method of generating helical gear teeth, which consists in rotating a hob, rotating a gear blank in predetermined harmonious engagement with the rotation of said hob, simultaneously effecting a relative feed of said rotating parts parallel with the axis of the gear blank, and establishing inbetween one of the rotating members from which the feed is taken off and one of said rotating parts a correlation such that equal fractional parts of a revolution of one of said engaging member result, corresponding in number to the number of revolutions required to finish the lead and variable according to the amount of feed and during the effective relative feed of the blank and hob for a certain distance in a direction parallel to the axis of the blank.

4. The method of generating helical gear teeth, which consists in rotating a gear blank and helical cutter in operative engagement with each other, effecting the relative feed thereof parallel to the axis of the blank at a predetermined correlated rate of movement, the relative action of said blank and cutter being also correlated and additionally dependent upon a ratio between a spur constant and a helical constant which is either one more or one less.

5. The method of generating helical gear teeth, which consists in rotating a gear blank and helical cutter in operative engagement with each other, effecting a relative feed thereof parallel to the axis of the blank at a predetermined correlated rate of movement, the relative action of said blank and cutter being also correlated and additionally dependent upon a ratio between quotients in which the consequent differs by a predetermined number from the antecedent whereby both spur and helical constants are integral.

6. The method of cutting the teeth of helical gear wheels that have a directrix coinciding with the gear blank axis, which consists in rotating a helical cutter, and imparting rotary motion to a gear blank relative to said cutter through a correlated motion from a driver to said blank and cutter, respectively, feeding one of the parts relative to the rotations and parallel to the axis of said gear blank, and correlating the relative rotating movement of said blank and cutter according to the number of teeth in the gear and the number of threads in the cutter and also according to a ratio of movement in which the consequent is greater or less by one whereby to generate the teeth with absolute exactness.

7. The method of generating helical gear teeth, which consists in rotating a hob, rotating a gear blank in predetermined harmony with the rotation of said hob, simultaneously effecting a relative feed between said rotating parts parallel to the axis of the gear blank, establishing a lead correlation of movement of one of said rotating parts such that an accumulation of a uniform measure (increment or decrement) occurs which is the operative equivalent of one exact revolution of the gear blank with reference to the rotations of an interjacent factor of said correlation while the feed equals a certain distance along the axis of the blank, and establishing an indexing correlation between the other of said rotating parts and the same interjacent factor of the complete correlation or harmonious relationship between the rotations of said blank and hob, whereby said feed correlation is in between such indexing and lead correlations for the purpose specified.

8. The method of generating helical gear teeth which consists in rotating a gear blank and helical cutter in correlation each with a third rotating part, one of said correlations being constant for a given number of teeth, effecting the relative feed of the blank and cutter parallel to the axis of the blank at a predetermined correlated rate of movement to the rotation of said third rotating part, the relative action of said third rotating part and blank being also correlated and additionally dependent upon a ratio in which the antecedent and consequent so differ by one that the number represented by the helical constant denotes exactly the number of revolutions of the blank, and the number represented by the spur constant denotes exactly the number of revolutions of the third rotating part, and that such ratio prevails throughout the feed.

9. The method of cutting helical gear teeth which consists in rotating a blank and a hob in engagement with each other, establishing a predetermined correlation between a rotating member and one of said engageable parts equal to the ratio of the number of the teeth to be cut divided by the number of threads in the hob, transmitting power from said member to effect a relative feed movement between said engageable parts, and establishing between said member and the other of said engageable parts a correlation equal to the ratio of the quotient of the lead divided by the feed and the quotient of the lead divided by the feed plus or minus one, whereby to simplify the computations required to determine said correlated movements in the manner specified.

10. The method of generating helical gear teeth consisting of imparting rotary motion from a driver to a helical cutter, intermediate member and gear blank respectively, said helical cutter and intermediary member having fixed relative rotations determined by the number of teeth in the gear blank and the number of threads in the cutter, said intermediary member and gear blank having correlated movements independent of the cutter rotation and dependent upon the quotient of a ratio in which the helical constant is greater or less by one than the spur constant, and feeding said cutter relative to the rotations of said intermediary member and dependent upon the correlation of said intermediary member and blank in a direction parallel to the axis of the blank.

11. The method of generating helical gear teeth, consisting of imparting rotary motion from a driver to a helical cutter, intermediate member and gear blank respectively, effecting a relative feed movement between the blank and cutter, a predetermined correlation existing between one of the engaging parts and said intermediate member, imparting distinct correlated movements between the other part and said intermediate member and between the latter and said feed movement dependent on each other and independent of the first for imparting differential rotary motion to one of the members and relative feeding motion parallel to the axis of the blank.

12. The method of cutting a helical gear wheel which consists in establishing definite ratios of movement as between blank rotation, hob rotation and a relative feed movement each with reference to a third rotating member such that two of such ratios of action may be varied independently of another.

13. The method of cutting the teeth of helical gear wheels which consists in establishing two distinct correlations of rotation between a blank and a helical cutter, and transmitting a relative feeding movement from one intermediary component of said correlated actions, one of said correlated actions being dependent upon the desired character of the blank and the existing character of the cutter, and the other being dependent upon the feed.

14. The method of cutting helical gear teeth of any angle which consists in rotating a blank and tool in operative engagement with each other, establishing a correlation between the rotation of one of the operating parts and a rotating constant for a given number of teeth, causing a relative feed movement, and effecting distinct correlations between said feed movement and said constant and between such constant and the other of said operating parts.

Signed by me, this 5th day of January, 1917.

CHARLES H. SCHURR.